(12) United States Patent
Thompson

(10) Patent No.: US 9,374,938 B2
(45) Date of Patent: Jun. 28, 2016

(54) SOIL SPREADING SCRAPER DEVICE

(71) Applicant: Dynamic Ditchers Inc., Dugald (CA)

(72) Inventor: Mark C. Thompson, Dugald (CA)

(73) Assignee: DYNAMIC DITCHERS INC., Dugald, Manitoba (CA)

( * ) Notice: Subject to any disclaimer, the term of this patent is extended or adjusted under 35 U.S.C. 154(b) by 22 days.

(21) Appl. No.: 14/264,594

(22) Filed: Apr. 29, 2014

(65) Prior Publication Data
US 2015/0305223 A1    Oct. 29, 2015

(51) Int. Cl.
*A01B 49/02* (2006.01)
*A01B 39/04* (2006.01)
*A01B 39/08* (2006.01)

(52) U.S. Cl.
CPC ............ *A01B 49/022* (2013.01); *A01B 39/04* (2013.01); *A01B 39/085* (2013.01)

(58) Field of Classification Search
CPC ...... A01B 49/02; A01B 49/022; A01B 39/04; A01B 39/085; A01B 13/00; E02F 3/76; E02F 5/025; E02F 5/027; E02F 5/282
USPC .......... 172/118, 784, 799.5, 145; 37/94, 244, 37/248, 253, 366, 367, 380, 381, 386
See application file for complete search history.

(56) References Cited

U.S. PATENT DOCUMENTS

| 2,619,746 | A | * | 12/1952 | Heaman | 37/251 |
| 2,798,314 | A | * | 7/1957 | Brite | 37/94 |
| 2,966,128 | A | * | 12/1960 | Toulmin, Jr. | 111/130 |
| 3,539,059 | A | * | 11/1970 | Buschbom | 406/57 |
| 3,589,500 | A | * | 6/1971 | Hansen | 198/640 |
| 3,608,557 | A |   | 9/1971 | Evans | |
| 3,624,826 | A |   | 11/1971 | Rogers | |
| 4,595,318 | A | * | 6/1986 | Viesselmann | 406/97 |
| 5,113,610 | A |   | 5/1992 | Leibrecht et al. | |
| 5,190,140 | A |   | 3/1993 | Buschbom | |
| 5,237,761 | A |   | 8/1993 | Nadeau et al. | |
| 5,864,970 | A | * | 2/1999 | Maddock et al. | 37/94 |
| 6,226,903 | B1 |   | 5/2001 | Erickson | |
| 6,418,647 | B1 | * | 7/2002 | Erickson | 37/366 |
| 6,425,445 | B1 | * | 7/2002 | Tarver, III | 172/166 |
| 6,536,140 | B2 |   | 3/2003 | Vaags et al. | |
| 6,681,552 | B2 |   | 1/2004 | Nelson et al. | |
| 7,520,113 | B2 | * | 4/2009 | Johnson et al. | 56/11.2 |
| 7,627,964 | B2 |   | 12/2009 | Vaags et al. | |
| 7,669,400 | B2 |   | 3/2010 | Naaktgeboren | |
| 2002/0124438 | A1 | * | 9/2002 | Vaags et al. | 37/94 |

* cited by examiner

*Primary Examiner* — Robert Pezzuto
*Assistant Examiner* — Jessica H Lutz
(74) *Attorney, Agent, or Firm* — Ryan W. Dupuis; Kyle R. Satterthwaite; Ade & Company Inc.

(57) ABSTRACT

A soil spreading scraper device comprises a cutting blade for cutting a top layer of soil from the ground, a kicker for throwing the cut soil rearward from the cutting blade, and an impeller member rotatable within a plane of rotation extending upward and rearward from the cutting blade for capturing the soil thrown by the kicker and spreading the cut soil generally radially outward relative to an axis of rotation of the impeller.

20 Claims, 13 Drawing Sheets

SOIL SPREADING SCRAPER DEVICE

FIELD OF THE INVENTION

The present invention relates to a soil spreading scraper device which is arranged to cut a top layer of soil from the ground as the device is displaced along the ground in a forward working direction and which is arranged to spread the cut soil transversely to the forward working direction.

BACKGROUND

In some situations it is required to pick up soil at one location and transport it to another. In the case of road building for instance, the contour of the ground is changed to form a road by taking the soil from one location and placing it in another. Not only must the soil be removed from one location, it must also be placed in another specific location.

In many situations however, it is only desired to remove the soil from its current location, and the location it is moved to is not critical. Often it is desired to simply spread the removed soil so that it does not interfere with future operations on the land. An example is where ditches are made to drain standing water from ponds on agricultural lands.

Conventional soil moving machines include scrapers and loaders, where a generally horizontal blade is moved at a shallow depth along the ground, lifting soil and moving same into a bucket where it remains until dumped. Scrapers may incorporate a chain elevator to assist in moving the soil into the bucket. Trenchers or ditchers generally move the soil from the trench and pile it beside the trench, although ditchers are also known which spread the soil that is removed. Such soil-spreading ditchers are disclosed in U.S. Pat. Nos. 3,624,826 to Rogers, U.S. Pat. No. 5,237,761 to Nadeau et al., U.S. Pat. No. 5,113,610 to Liebrecht et al., and U.S. Pat. No. 6,226,903B1 to Erickson.

The ditch cleaning apparatus of Rogers comprises a disc rotating in a substantially vertical plane. The apparatus rides on skids and is designed essentially to clean existing ditches. The ditcher of Nadeau et al. similarly comprises a disc rotating in a substantially vertical plane and having rippers ahead of the disc. The disc of Nadeau et al. disperses the soil loosened by the rippers. The apparatuses of Rogers and Nadeau et al. leave a ditch with a rounded bottom having a radius substantially equal to the radius of the disc.

The apparatus of Liebrecht et al., U.S. Pat. No. 5,113,610, uses a spinning disc to both cut and spread the soil. The plane of the disc is oriented at a shallow angle of 15-30 degrees above horizontal, and a shallow angle to one side of 10-30 degrees.

The apparatus of Erickson, U.S. Pat. No. 6,226,903, uses a blade to scrape up soil and deposit it onto a spinning disc that has a plane oriented at less than 45 degrees above horizontal. The blade raises the soil onto a pan and then the soil passes over the pan and onto the disc which has an edge that is juxtaposed to a semi-circular cut-out in the pan. The disc rotates at a relatively shallow angle so that the soil is not raised very much before it is thrown off the disc. A beater may be provided above the pan to push the raised soil down onto the disc as it leaves the pan. The beater axis is upwardly and rearwardly of the leading edge of the cutting blade such that the beater serves only to direct the soil which is already flowing upwardly from the cutting blade, rearwardly towards the spinning disc.

U.S. Pat. No. 6,536,140 belonging to Vaags et at is another example of a soil spreading scraper including a blade to scrape up soil and a spinning disc for spreading the cut soil. A kicker supported for rotation about a horizontal axis ahead of the spinning disc assists in feeding cut soil to the spinning disc. The cutting blade is parallel to the rotation plane of the disc at a steep angle of near 75 degrees from horizontal such that the kicker is necessarily spaced well above the ground. Accordingly, similarly to Erickson noted above, the kicker serves only to direct the soil which is already flowing upwardly from the cutting blade, rearwardly towards the spinning disc.

U.S. Pat. No. 7,627,964 by Vaags et al is yet another example of a soil spreading scraper including a blade to scrape up soil, a spinning disc for spreading the cut soil, and a kicker ahead of the spinning disc to assist in feeding cut soil from the cutting blade to the spinning disc. Substantially the entire kicker is upwardly and rearwardly of the leading edge of the cutting blade such that the kicker serves only to direct the soil which is already flowing upwardly from the cutting blade, rearwardly towards the spinning disc.

Many of the ditcher implements noted above encounter problems of wear of the impeller blades on the spinning discs thereof. U.S. Pat. No. 5,190,140 by Buschbom discloses one example of liners on the leading faces of the impeller blades which can be replaced when worn. The impeller blades and the liners supported thereon must be rotated in close proximity to a peripheral wall of the chamber rotatably receiving the impeller blades therein for efficient operation, however, it can be difficult to manufacture the impeller blades with the degree of precision required for optimal efficiency.

Among the ditcher type implements noted above which include a kicker above the cutting blade, another problem which is encountered is the lodging of debris between the kicker and the cutting blade which prevents continued rotation of the kicker. Examples of reverser mechanisms for various implements are disclosed in U.S. Pat. No. 7,669,400 by Naaktgeboren, U.S. Pat. No. 6,681,552 by Nelson et al, and U.S. Pat. No. 3,608,557 by Evans; however, none of the prior art devices are suitably arranged for incorporation into a ditcher implement in a manner which readily permits maintenance as required.

SUMMARY OF THE INVENTION

According to one aspect of the invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees from horizontal;

a cutting blade supported on the frame forwardly and downwardly relative the impeller member and arranged to cut a top layer of soil from the ground as the frame is displaced in the forward working direction; and a kicker supported on the frame for rotation about a kicker axis spanning above the cutting blade transversely to the forward working direction and arranged to propel soil generally rearward onto the impeller member;

the impeller member comprising a plurality of impeller blades arranged to spread soil deposited on the impeller member generally radially outward from the impeller axis as the impeller member is rotated;

the cutting blade projecting downwardly and forwardly to a forward cutting edge at an angle from horizontal which is less than the plane of rotation of the impeller member; and the forward cutting edge being positioned rearwardly of the kicker axis.

The arrangement of the cutting edge being positioned rearwardly of the kicker axis in combination with a cutting blade at an inclination which is closer to horizontal than the plane of rotation of the impeller member permits the kicker to engage the soil to be cut earlier than prior art arrangements to better assist flow of soil Preferably the cutting blade projects downwardly and forwardly to a forward cutting edge at an angle which is less than 45 degrees from horizontal, and more preferably which is between 15 and 25 degrees from horizontal.

The cutting blade may further comprise a plurality of soil engaging fingers projecting downwardly and forwardly from the forward cutting edge of the cutting blade at laterally spaced apart positions. Preferably the soil engaging fingers terminate at respective forward ends which are in proximity to a vertical plane locating the kicker axis therein.

In one embodiment of the kicker, the kicker comprises a shaft supported along the kicker axis for rotation about the kicker axis relative to the frame, and a plurality of kicker blades mounted on the shaft to extend generally radially outwardly therefrom, in which each kicker blade is angularly offset in a circumferential direction relative to all other ones of the kicker blades. Furthermore, when the kicker blades are all spaced apart from one another in an axial direction of the kicker axis, preferably the kicker blades are mounted angularly offset from one another in the circumferential direction according to a prescribed soil striking sequence such that no axially adjacent pairs of the kicker blades are immediately adjacent one another in the prescribed soil striking sequence.

When the impeller member comprises a disc body and a plurality of impeller blades supported on the disc body so as to be arranged to spread soil deposited on the impeller member generally radially outward from the impeller axis as the impeller member is rotated, preferably each of the impeller blades comprises: i) a main body portion which projects generally upward from the disc body in a direction of the impeller axis and which extends radially outward from an inner end in proximity to the impeller axis to an outer end in proximity to a peripheral edge of the impeller member, and ii) a wear member supported on the main body portion to project radially outward beyond the outer end of the main body portion. Preferably the wear member is adjustable in a radial direction relative to the main body portion.

The device may further comprise a reverser assembly which comprises: i) a reverser frame mounted on the main frame; ii) a ratchet wheel mounted about the kicker axis, the ratchet wheel including a plurality of circumferentially spaced apart ratchet teeth thereon; iii) a ratchet pin arranged for ratcheting engagement with the ratchet teeth on the ratchet wheel; iv) a linear hydraulic actuator supported on the reverser frame and supporting the ratchet pin thereon so as to be arranged to stroke the ratchet pin in a first direction towards a first extended position and in an opposing second direction towards an opposing second retracted position; and v) a guide on the reverser frame arranged to restrict movement of the ratchet pin substantially along one side of the ratchet wheel between the first and second positions.

Preferably the ratchet wheel is coupled to the kicker such that the kicker is rotatable with the ratchet wheel about the kicker axis in a direction opposite to a normal working direction when the ratchet wheel is rotated with displacement of the ratchet pin in the second direction.

Preferably the ratchet pin and the ratchet teeth on the ratchet wheel are configured such that the ratchet pin is slidably displaced over the ratchet teeth without rotating the ratchet wheel when displaced in the first direction and such that the ratchet pin positively engages one of the ratchet teeth to drive rotation of the ratchet wheel when displaced in the second direction. Preferably the linear hydraulic actuator, the ratchet pin, and the guide are selectively removable from the main frame together with the reverser frame as a unitary assembly.

According to a second aspect of the present invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees from horizontal;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a disc body and a plurality of impeller blades supported on the disc body so as to be arranged to spread soil deposited on the impeller member generally radially outward from the impeller axis as the impeller member is rotated;

each of the impeller blades comprising:
a main body portion which projects generally upward from the disc body in a direction of the impeller axis and which extends radially outward from an inner end in proximity to the impeller axis to an outer end in proximity to a peripheral edge of the impeller member; and
a wear member supported on the main body portion to project radially outward beyond the outer end of the main body portion;
the wear member being adjustable in a radial direction relative to the main body portion.

The radial adjustability of a wear member which projects radially outwardly beyond the end of the impeller blade readily permits the outer end of the wear member to be closely located relative to the surrounding peripheral edge of the chamber receiving the impeller blade therein for optimal efficiency of operation of the impeller using a simple construction.

Preferably the wear member of each impeller blade is supported on the main body portion using threaded fasteners, and wherein at least one of the main body portion and the wear member comprises fastener apertures receiving the threaded fasteners therethrough in which the fastener apertures are elongated in the radial direction.

Preferably the main body portion of each impeller blade is also supported on the disc body so as to be adjustable relative to the disc body in the radial direction.

The wear member of each impeller blade may include i) a mounting portion which is fastened to a trailing side of the main body portion and ii) an end portion which projects from the mounting portion into a direction of rotation of the impeller member so as to overlap the outer end of the main body portion.

When each impeller blade further comprises an upper portion extending radially along a top edge of the main body portion so as to be inclined upwardly and forwardly into a direction of rotation of the impeller member, preferably the wear member spans both an outer end of the upper portion and the outer end of the main body portion.

According to a third aspect of the present invention there is provided a soil spreading scraper device comprising:

a main frame supported for movement along the ground in a forward working direction;

an impeller member supported on the main frame for rotation about an impeller axis within a plane of rotation lying generally perpendicularly to the impeller axis, the plane of rotation extending generally upward and rearward at an angle between 45 degrees and 75 degrees from horizontal;

a cutting blade supported on the main frame forwardly and downwardly relative the impeller member and arranged to cut a top layer of soil from the ground as the main frame is displaced in the forward working direction;

a kicker supported on the main frame for rotation about a kicker axis spanning above the cutting blade transversely to the forward working direction in a working direction so as to be arranged to propel soil cut by the cutting blade generally rearward onto the impeller member;

the impeller member comprising a plurality of impeller blades arranged to spread soil deposited on the impeller member generally radially outward from the impeller axis as the impeller member is rotated;

a reverser assembly comprising:
a reverser frame mounted on the main frame;
a ratchet wheel mounted about the kicker axis, the ratchet wheel including a plurality of circumferentially spaced apart ratchet teeth thereon;
a ratchet pin arranged for ratcheting engagement with the ratchet teeth on the ratchet wheel;
a linear hydraulic actuator supported on the reverser frame and supporting the ratchet pin thereon so as to be arranged to stroke the ratchet pin in a first direction towards a first position and in an opposing second direction towards an opposing second position;
a guide on the reverser frame arranged to restrict movement of the ratchet pin substantially along one side of the ratchet wheel between the first and second positions;
the ratchet pin and the ratchet teeth on the ratchet wheel being configured such that the ratchet pin is slidably displaced over the ratchet teeth without rotating the ratchet wheel when displaced in the first direction and such that the ratchet pin positively engages one of the ratchet teeth to drive rotation of the ratchet wheel when displaced in the second direction;
the ratchet wheel being coupled to the kicker such that the kicker is rotatable with the ratchet wheel about the kicker axis in a direction opposite to the working direction when the ratchet wheel is rotated with displacement of the ratchet pin in the second direction;

wherein the linear hydraulic actuator, the ratchet pin, and the guide are selectively removable from the main frame together with the reverser frame as a unitary assembly.

Preferably the linear hydraulic actuator is pivotally coupled to the reverser frame at a first end of the actuator and the ratchet pin is supported in fixed relation to a second end of the actuator.

The reverser frame may be coupled to the main frame using threaded fasteners.

Preferably the frame includes at least one upright wall locating a slot therein which receives one end of the ratchet pin therein so as to define the guide which guides movement of the ratchet pin between the first and second positions.

In the illustrated embodiment, the reverser frame includes an inner upright wall and an outer upright wall receiving the ratchet wheel and the linear hydraulic actuator therebetween in which both upright walls locate respective slots therein which receive opposing ends of the ratchet pin therein such that the two slots collectively define the guide.

Each slot preferably has a width which is greater than a diameter of the pin so as to allow outward displacement of the ratchet pin in a radial direction of the ratchet wheel over the ratchet teeth when displaced in the first direction.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
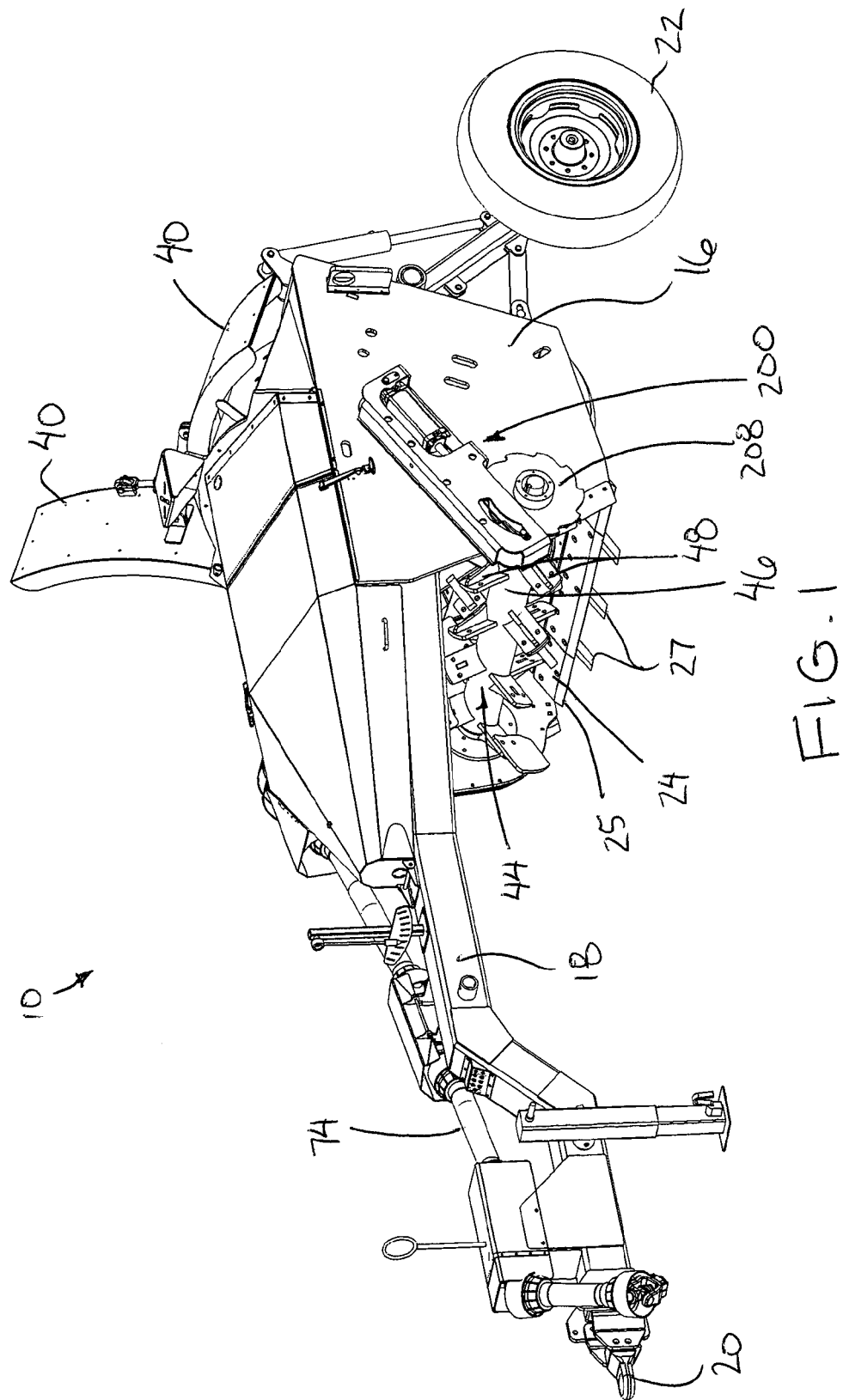
FIG. 1 is a perspective view of the soil spreading scraper device.
Figure 2:
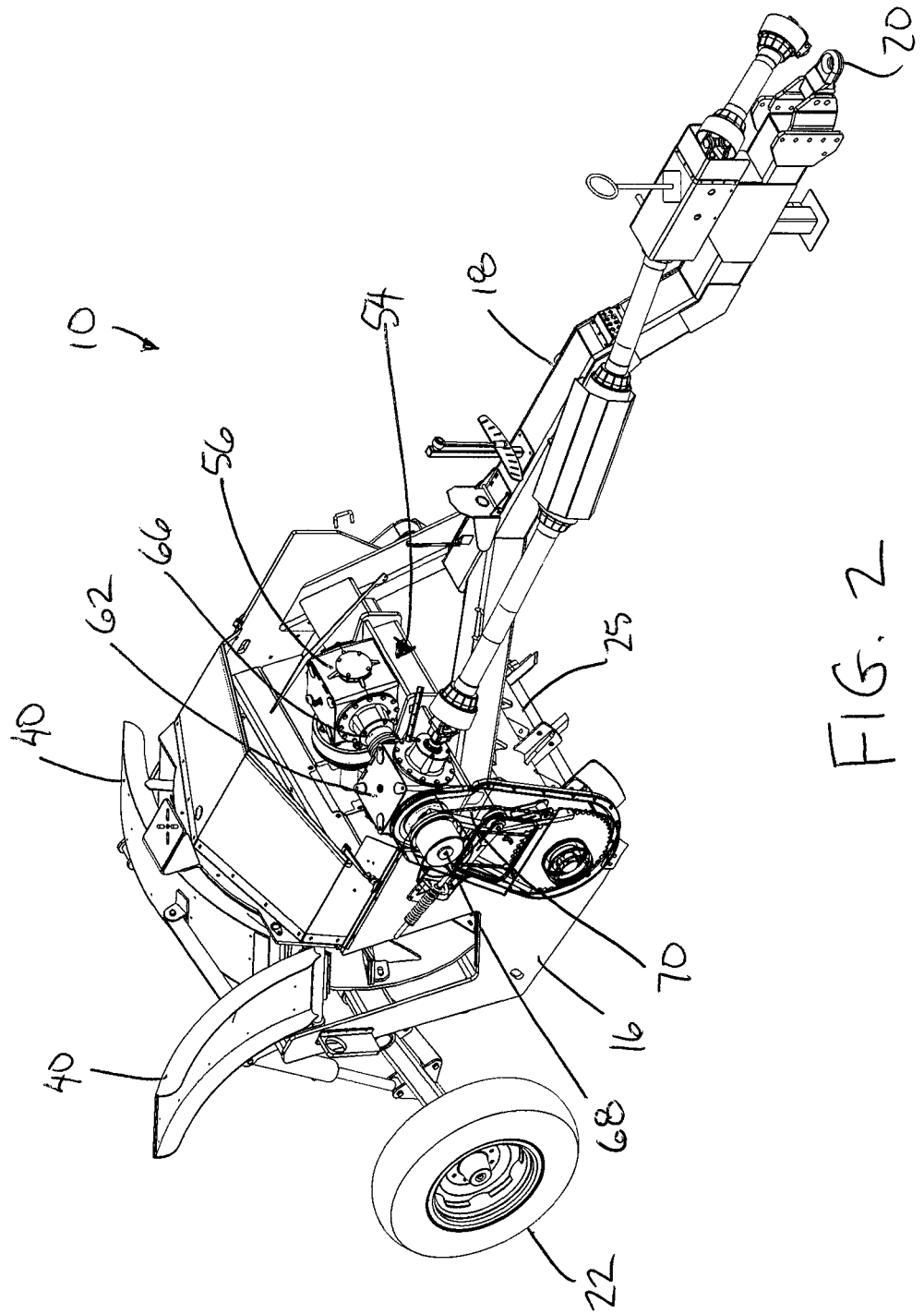
FIG. 2 is another perspective view of the device shown with some of the housing elements removed.
Figure 3:
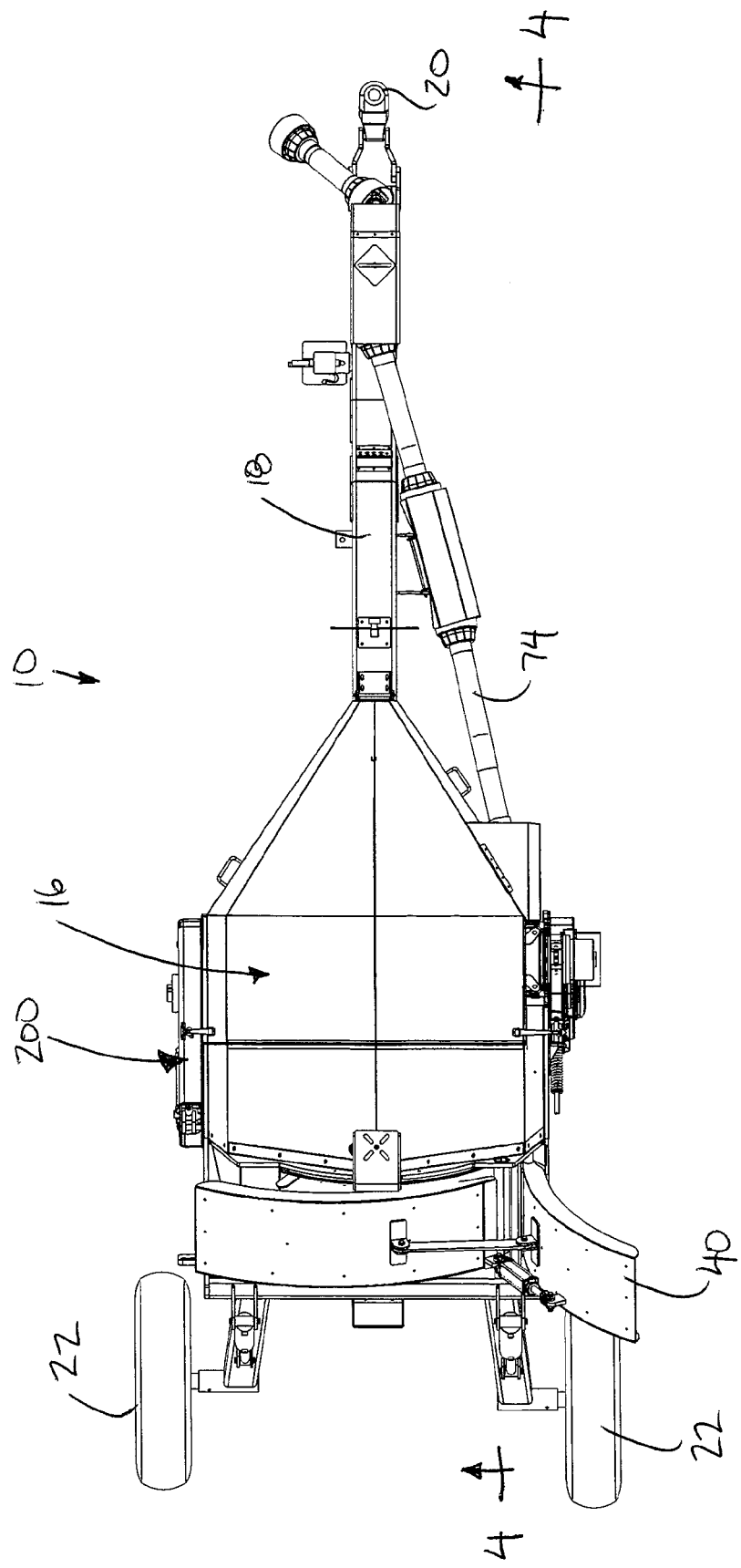
FIG. 3 is a top plan view of the device.
Figure 4:
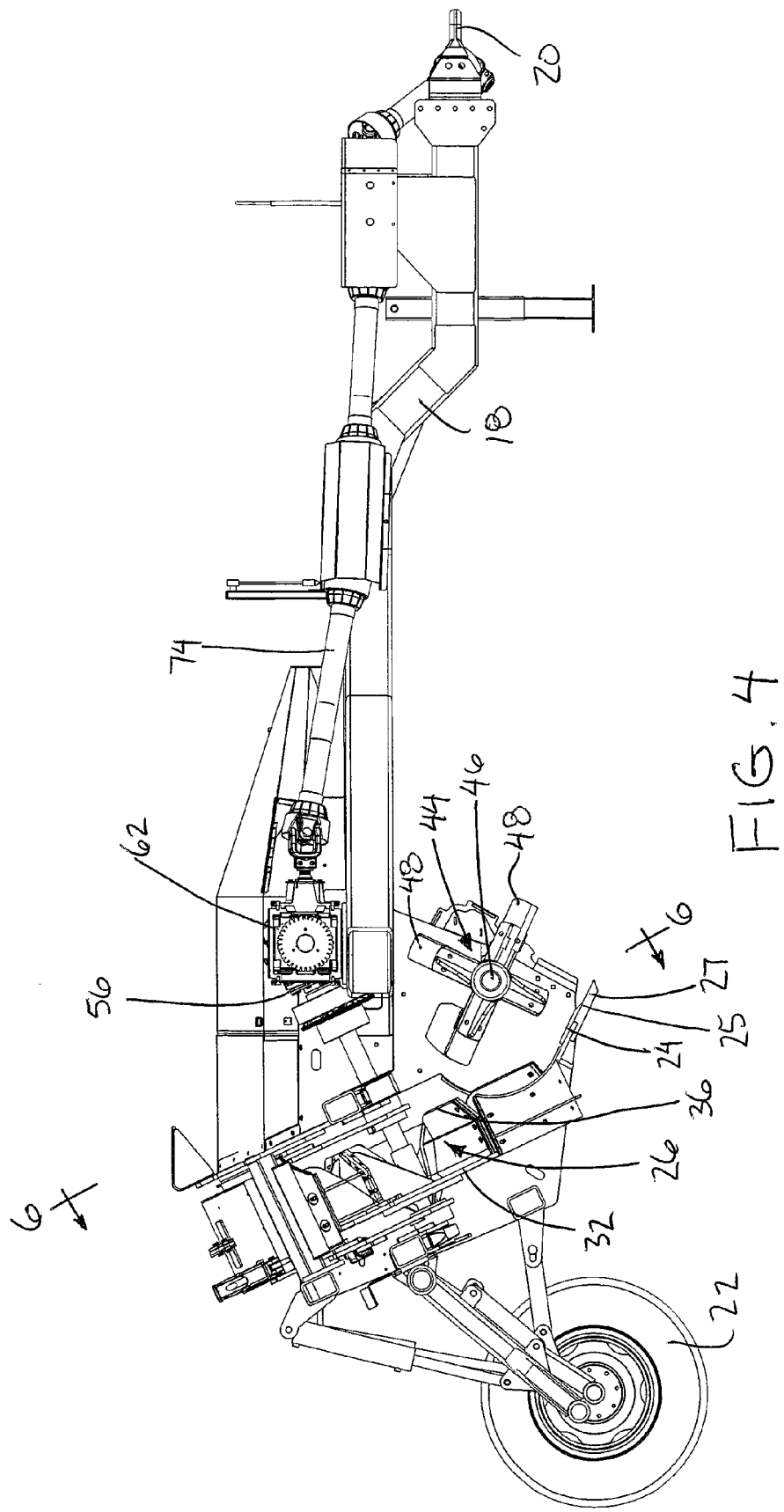
FIG. 4 is a sectional view along the line 4-4 of FIG. 3.
Figure 5:
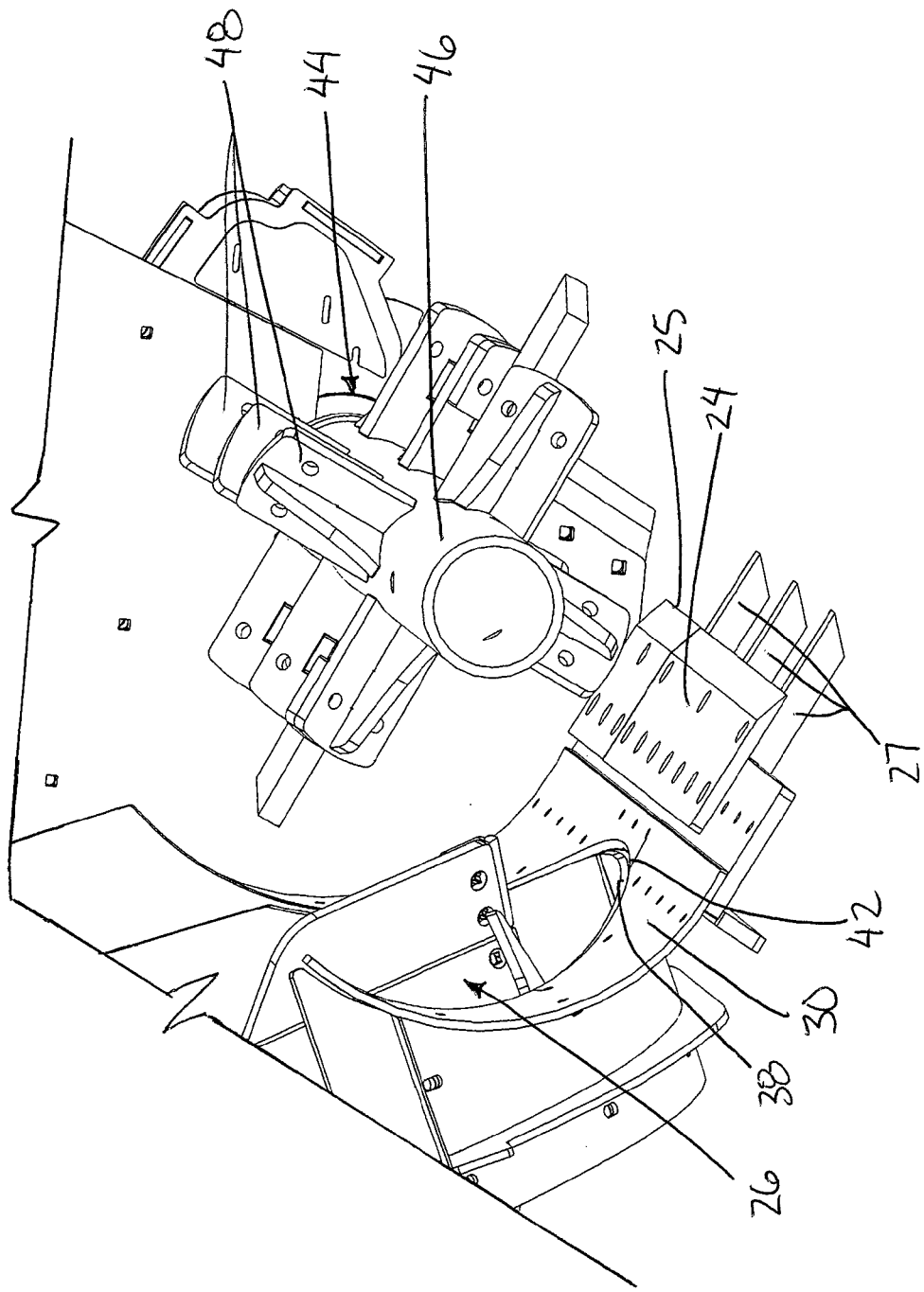
FIG. 5 is a partly sectional perspective view of the kicker assembly and cutting blade of the device.
Figure 6:
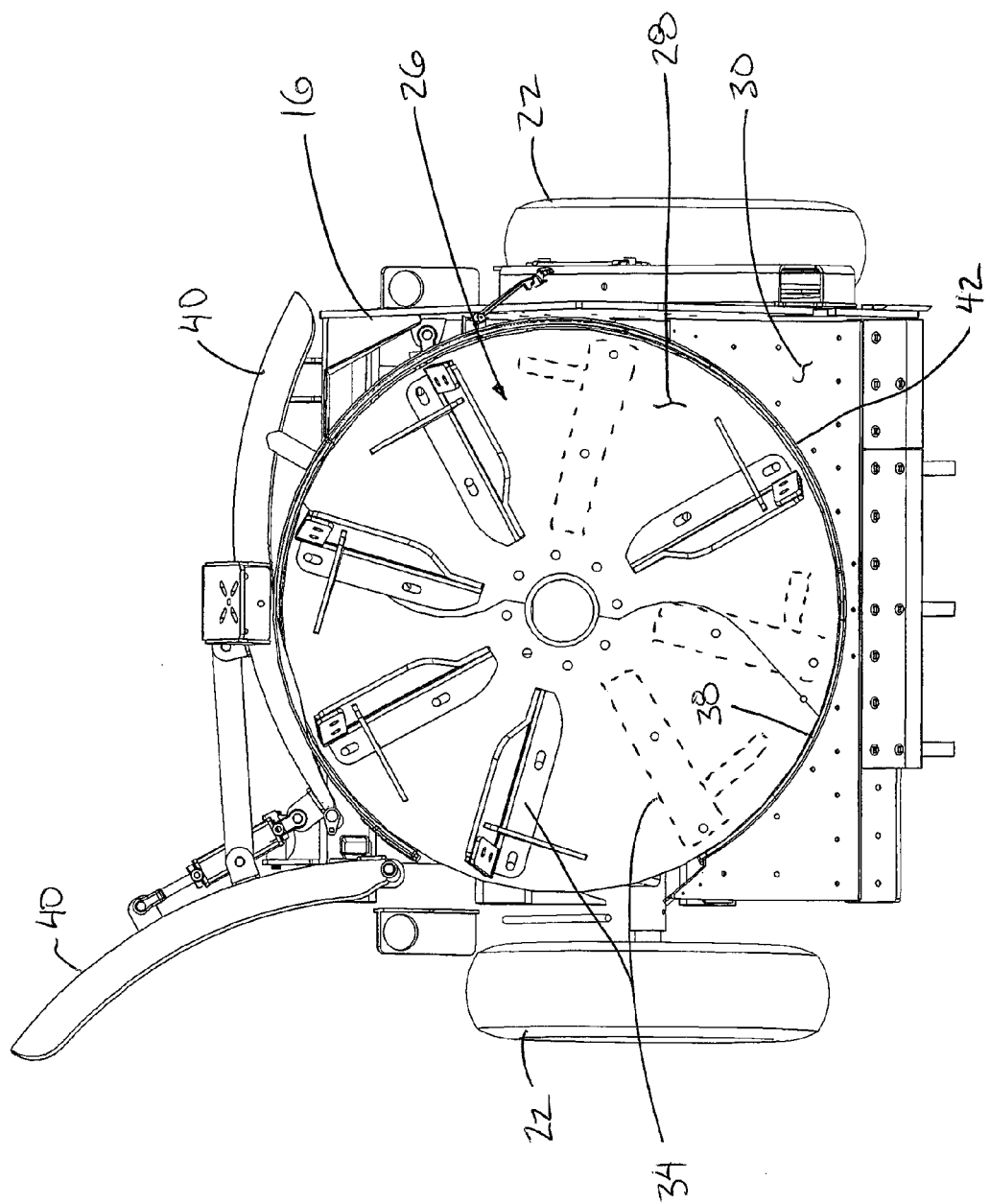
FIG. 6 is a plan view of the impeller member supporting the impeller blades thereon.
Figure 7:
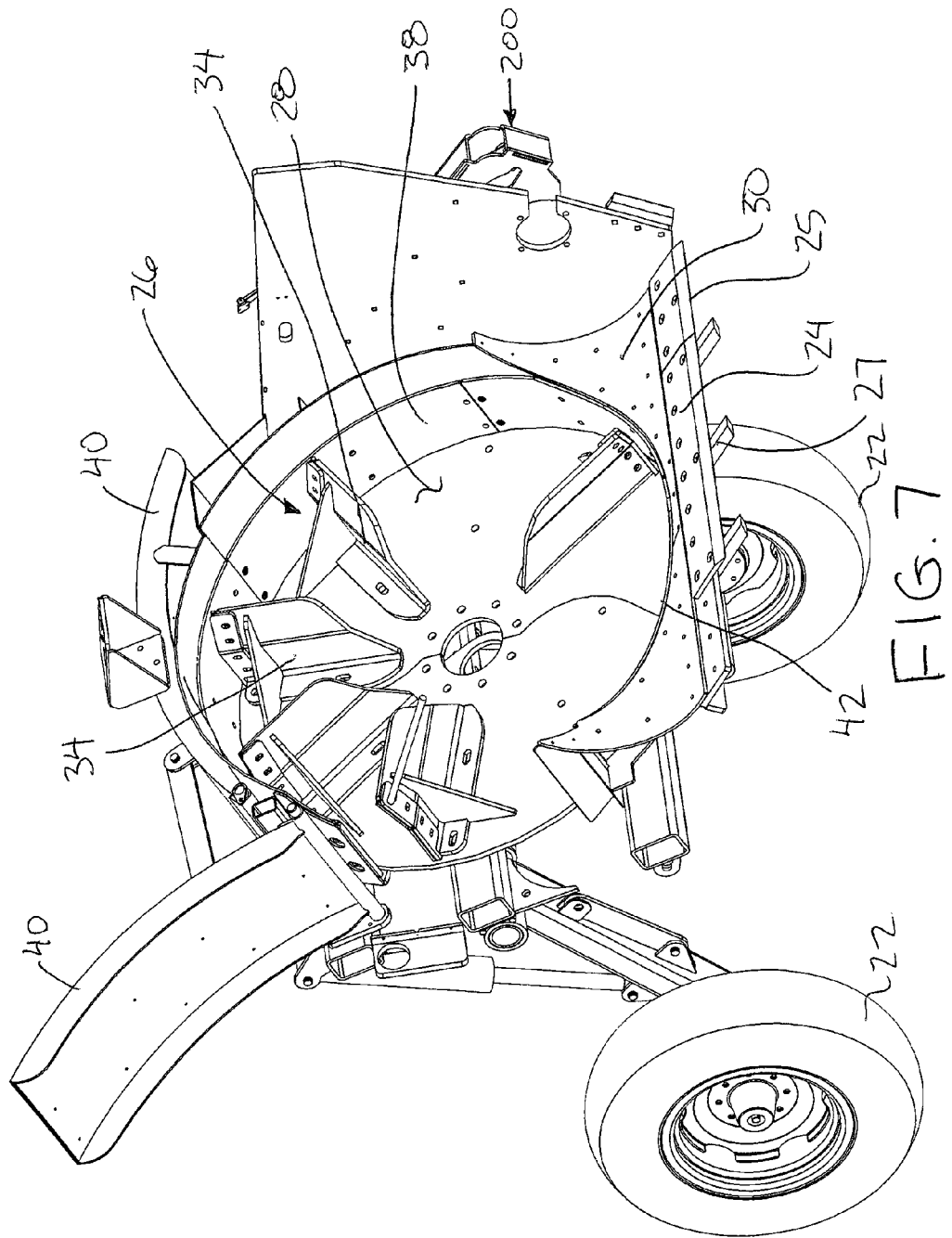
FIG. 7 is a perspective view of some of the components of the impeller member.
Figure 8:
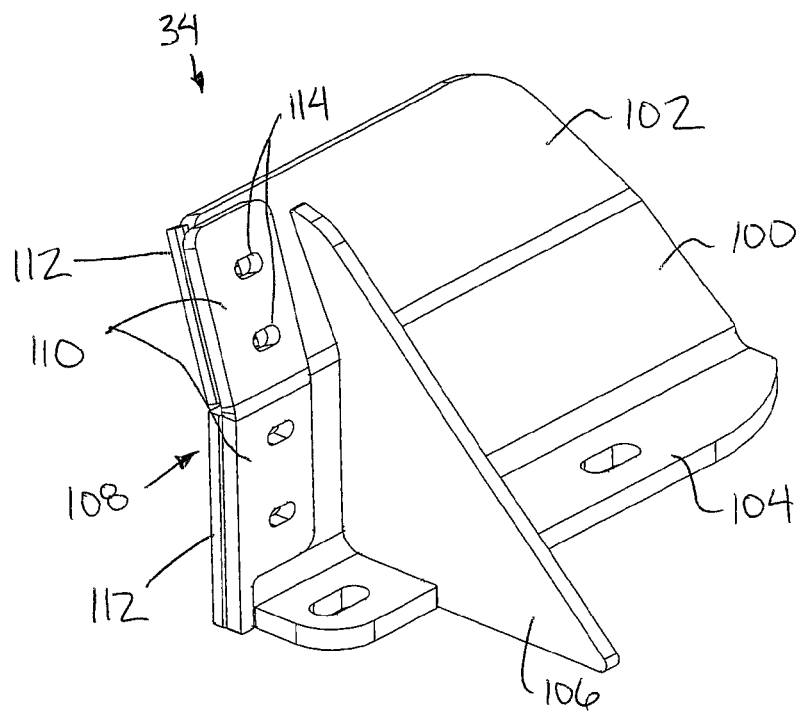
FIG. 8 is a perspective view of a trailing side of one impeller blade shown removed from the impeller member of the soil spreading scraper device.
Figure 9:
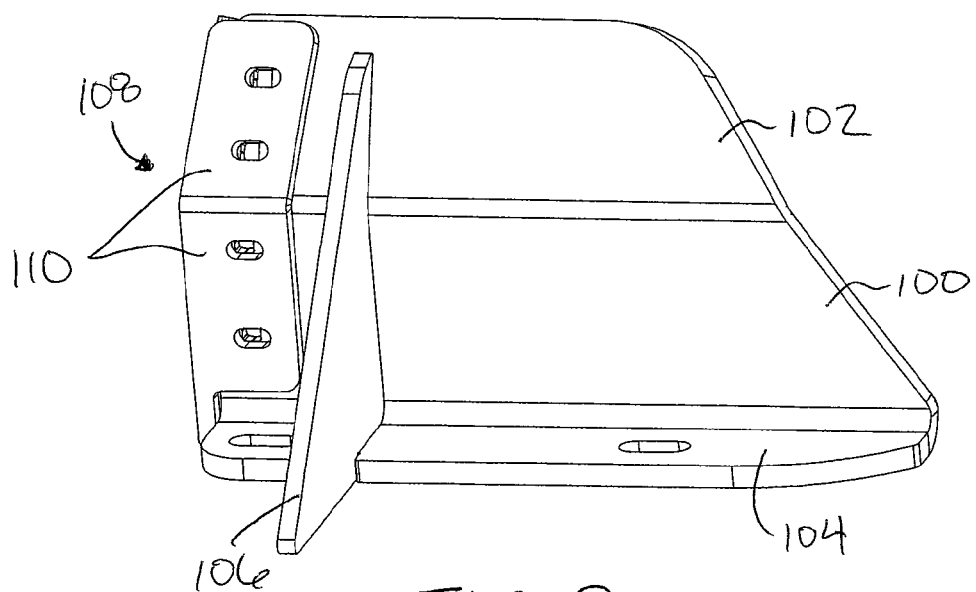
FIG. 9 is a trailing side view of the impeller blade.
Figure 10:
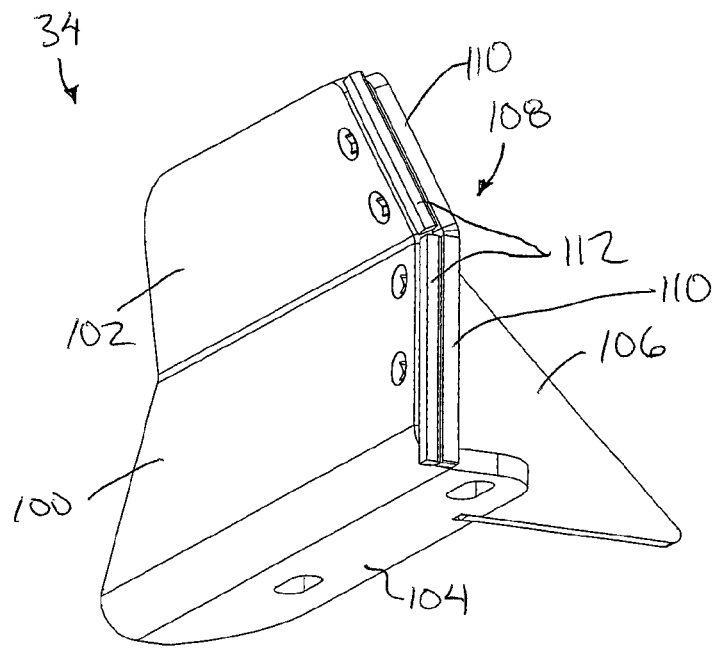
FIG. 10 is a perspective of a leading side of the impeller blade.
Figure 11:
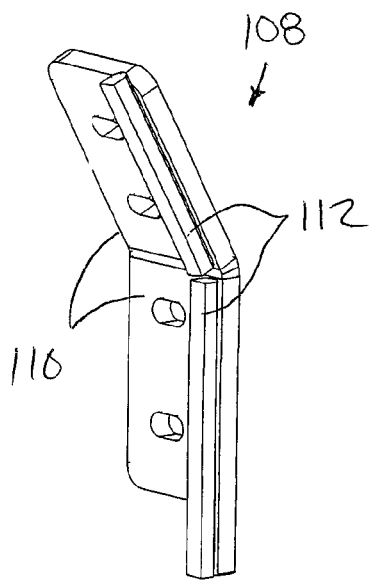
FIG. 11 is a perspective view of the wear member shown separated from the impeller blade.
Figure 12:
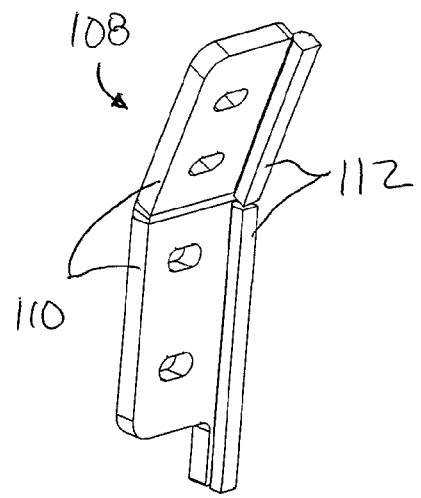
FIG. 12 is another perspective view of the wear member.
Figure 13:
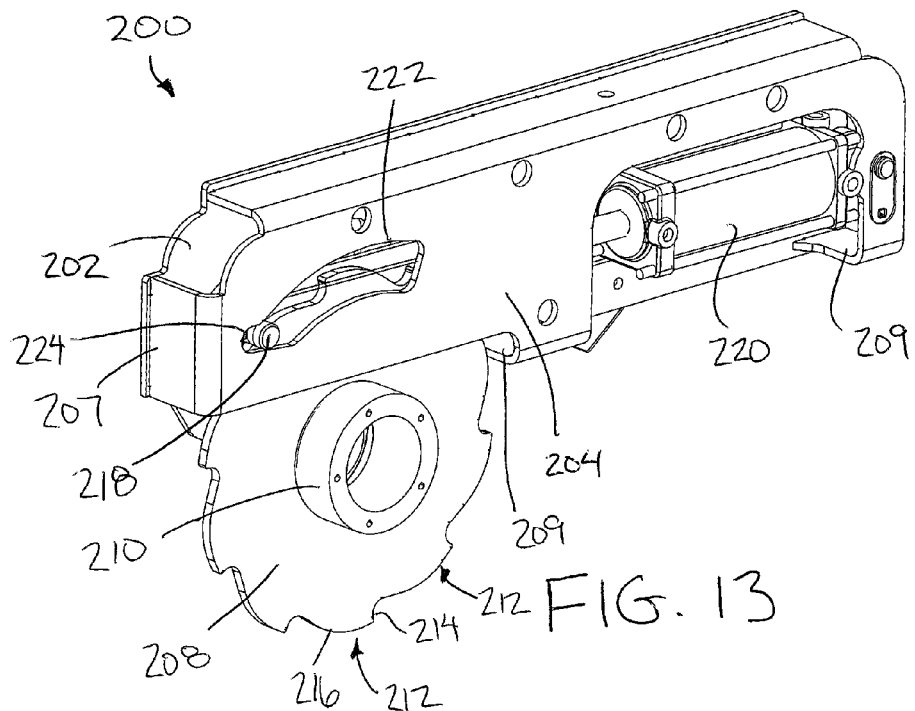
FIG. 13 is a perspective view of an outer side of the reverser assembly shown separated from the main frame of the soil spreading scraper device.
Figure 14:
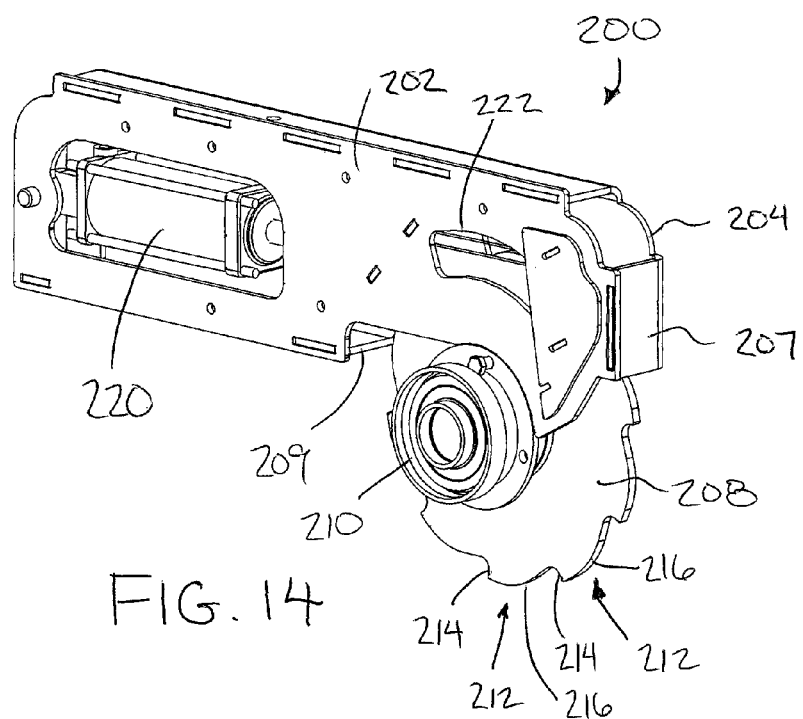
FIG. 14 is a perspective view of an inner side of the reverser assembly.
Figure 15:
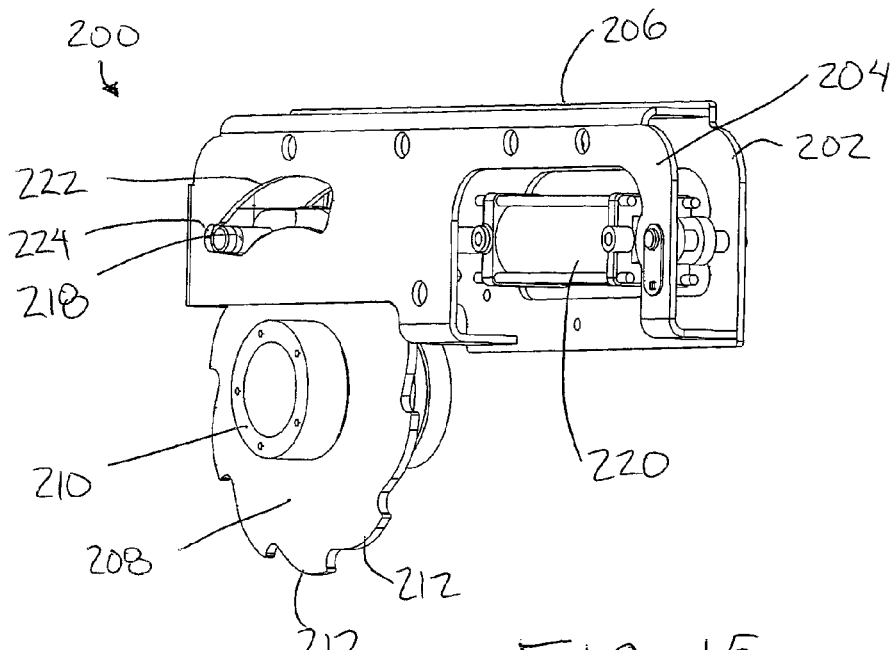
FIG. 15 is another perspective view of the outer side of the reverser assembly.
Figure 16:
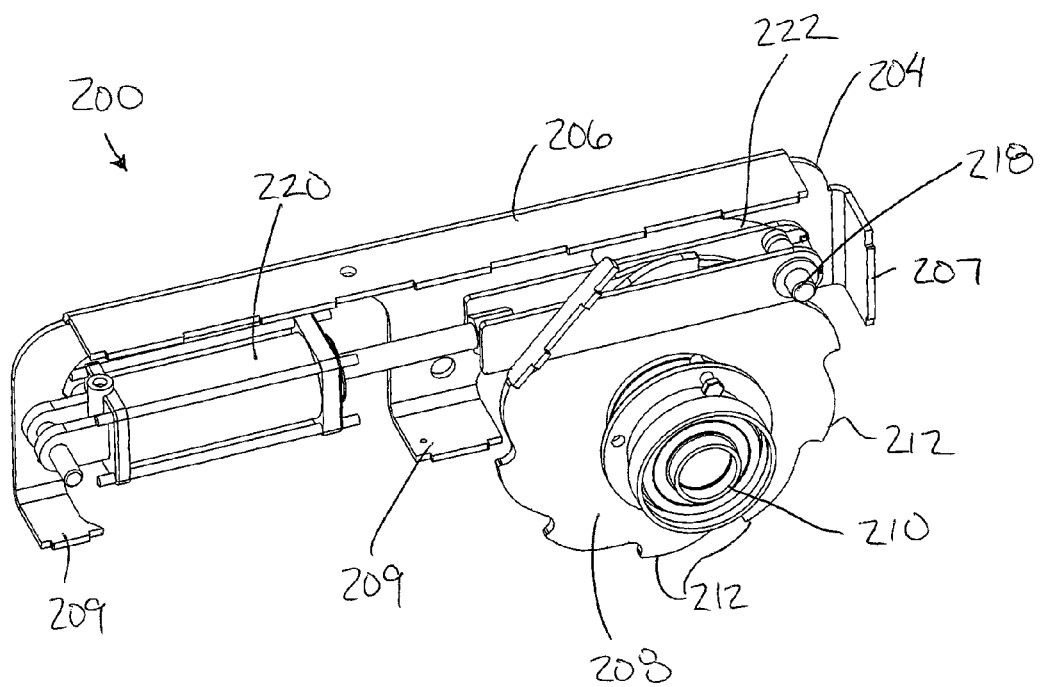
FIG. 16 is a further perspective view of the inner side of the reverser assembly shown with the inner upright wall removed.

Referring to the accompanying figures there is illustrated a soil spreading scraper device generally indicated by reference numeral 10. The device 10 is particularly suited for cutting a top layer of soil from the ground as the device is advanced in a forward working direction across the ground and for spreading the cut soil laterally outward to one side relative to the forward working direction.

In the illustrated embodiment, the device 10 includes a frame which is suitable for towing by a towing vehicle such as a tractor including a suitable hitch and power takeoff.

The main frame 16 of the device 10 includes a main body from which a hitch arm 18 projects forwardly towards a hitch connector 20 at a forward end thereof suitable for connection to the hitch of the towing vehicle. The main body is supported at a rear end by a pair of wheels 22 which are laterally spaced apart at the rear end of the main body. The wheels 22 are supported for independent height adjustment relative to the main body for adjusting the overall height of the frame, which in turn adjusts the depth of cut of the device into the soil, and for adjusting the inclination of the frame relative to the ground which adjusts an angle of cut of the device into the ground.

The device 10 generally comprises a cutting blade 24 spanning laterally across the frame for cutting the top layer of soil from the ground, an impeller member 26 which spreads the soil cut by the cutting blade 24 and a kicker 44 for propelling the soil cut by the cutting blade 24 onto the impeller member 26 which is rotatable about a horizontal kicker axis.

The cutting blade 24 spans along the front edge of the main body of the frame 16, along the bottom side thereof, to extend downwardly and forwardly to a forward cutting edge 25. The forward cutting edge spans linearly in a lateral direction across a full width of the impeller member, horizontally and perpendicularly to the forward working direction. The body of the cutting blade 24 is generally planar and oriented at an angle from horizontal which is less than the plane of rotation of the impeller member, for example at an angle which is between 15 and 25 degrees from horizontal, and more preferably which is near 20 degrees from horizontal.

The cutting blade further includes a plurality of soil engaging fingers 27 fastened below the planar body of the cutting blade. Each finger is an elongate, rigid member which projects downwardly and forwardly from the forward cutting edge of the cutting blade at laterally spaced apart positions so as to be parallel to the planar body and at the same inclination relative to the ground. The fingers 27 each terminate at a respective forward end which is spaced forwardly of the forward cutting edge 25. The forward ends of the fingers terminate substantially at a vertical plane locating the kicker axis therein.

A pan 30 extends rearwardly and upwardly from the cutting blade 24 towards the impeller member 26 which is positioned rearwardly of the soil cutting blade 24.

The impeller member 26 generally comprises a disc body 28 in the form of a flat, circular plate of rigid material defining a bottom side 32 of the impeller member which rotates within a rotation plane oriented perpendicularly to an impeller axis about which the impeller member rotates relative to the frame. The impeller member is supported on the frame so that the rotation plane extends at an upward and rearward angle from a location rearward of the cutting blade 24 at an angle of near 75° from the ground in the illustrated embodiment, though a rotation plane generally in the range of 45° to 75° can still be beneficial.

The impeller member includes a plurality of impeller blades 34 which are each fixed on the disc body at the bottom side 32 of the impeller member to extend both radially outward from the impeller axis to a periphery of the impeller member and to extend upwardly from the disc at the bottom side 32 generally in the direction of the impeller axis to an open top side 36 of the impeller member. The blades and the disc at the bottom side 32 of the impeller member are fixed for rotation together about the impeller axis so as to spread cut soil deposited on the impeller member generally radially outward relative to the impeller axis.

Each of the impeller blades 34 has a main body portion 100 and an upper portion 102. The main body portion is a planar body spans from an inner end near the impeller axis to an outer end adjacent a peripheral edge of the impeller member. The planar main body portion is also oriented perpendicularly to the rotation plane of the impeller to project upwardly from a bottom side abutted with the disc body to a top edge parallel to the bottom side.

An integral mounting flange 104 projects from the trailing side of the main body portion at the bottom side to receive fasteners for securing the mounting flange to the disc body. The fastener apertures in the mounting flange 104 which receive the fasteners therethrough are elongated in the radial direction of the impeller to allow for some adjustment of the main body portion 100 in the radial direction relative to the disc body. A triangular gusset 106 extends between the trailing side of the impeller blade and the disc body to provide additional support to the blade.

The upper portion 102 is also generally planar, but it extends upwardly from the top edge of the main body portion at an inclination into the direction of rotation. The resulting leading side of each impeller blade is thus substantially concave or cup shaped to assist in retaining soil on the leading side of each blade during rotation of the impeller until the impeller blade reaches a location where the surrounding periphery is open to one of the discharge chutes 40 where the soil is discharged from the implement. The upper portion 102 extends radially substantially a full length of the blade between an inner end adjacent the inner end of the main body portion and an outer end which is in a common plane with the outer end of the main body portion in proximity to the peripheral edge of the impeller member.

A wear member 108 is supported on each impeller blade to project radially outward beyond the outer end of the main body portion 100 and the upper portion 102. The wear member includes a mounting portion 110 formed of two planar portions which are angularly offset from one another to permit each planar portion to lie parallel against the trailing side of a respective one of the main body portion 100 and the upper portion 102. Each wear member also includes an end portion 112 which projects from the mounting portion into a direction of rotation of the impeller member along the full height of the wear member. The end portion 112 thus overlaps the outer end of the main body portion 100 and the upper portion 102 along a full height of the impeller blade.

Fastener apertures 114 are provided in each of the portions of the wear member to receive threaded fasteners which secure the wear member to the main body portion and the upper portion of the blade. The fasteners apertures are elongated in the radial direction of the impeller member to permit adjustment of the wear member relative to the main body portion in the radial direction. The outer end portion of the wear member can thus be precisely aligned with the peripheral edge of the disc body or any peripheral components of the main frame which surround the impeller member.

A peripheral wall 38 is provided about a bottom portion of the periphery of the impeller member 26 having a height which spans between the top and bottom sides of the impeller member. An inner surface of the peripheral wall 38 against which the impeller member periphery rotates may comprise a wear member having a low coefficient of friction, for example a plastic line. The wear member is mounted on the peripheral wall for ready separation and replacement thereof to maintain the wear member in optimal low friction condition. Periodic replacement of the wear member reduces friction of soil being spread by the impeller member as it is rotated along the inner surface of the peripheral wall 38 and thus minimizes friction against rotation of the impeller member. An upper portion of the periphery about the impeller member openly communicates with discharge chutes 40 curving upwardly and laterally outward so that the material thrown radially outward by the impeller member is thrown onto the chutes 40 and redirected generally laterally outward in a sideways direction which is generally perpendicular to the forward working direction.

The pan 30 terminates at a rear edge 42 which is semicircular about a centre at the impeller axis so that the edge 42 follows the shape of the peripheral wall 38 about a periphery of the impeller member 26.

The kicker 44 is supported for rotation on the frame about a respective kicker axis which extends generally horizontally, transversely and perpendicularly to the forward working direction, at a location which is spaced above and forward of the front edge of the cutting blade 24, while also being located forwardly of the impeller member, bellow the impeller axis.

The kicker 44 includes a shaft 46 extending along the kicker axis and arranged for supporting a plurality of kicker blades 48 extending generally radially outward therefrom. The plurality of kicker blades 48 are provided at circumferentially and axially spaced positions relative to one another with suitable dimensions to rotate in close proximity to the pan so that any soil cut by the cutting blade and lifted onto the pan is engaged by the kicker blades 48 which rotate rearwardly at a bottom side thereof to propel the cut soil rearwardly onto the impeller member.

The kicker blades 48 each comprise a planar paddle member oriented to project or propel the cut soil laterally inward towards a center of the kicker as it is thrown rearward onto the impeller member. More particularly, each planar paddle is oriented so as to be approximately 45 degrees in inclination relative to a first plane that is perpendicular to the axis of rotation, and a second plane that includes the axis of rotation therein. Due to the pan being terminated at a rearward edge at the front side of the impeller member and the high angle of elevational of the impeller member relative to the ground, the material thrown rearward by the kicker is projected onto a very large portion of the surface of the impeller member to encourage capturing a maximum volume of soil to be subsequently spread by the impeller member. The combination of the high angle impeller member and low rear edge of the pan further promotes rotation of the impeller member at higher revolutions per minute (RPM) as compared to prior art configurations.

Figure 17:
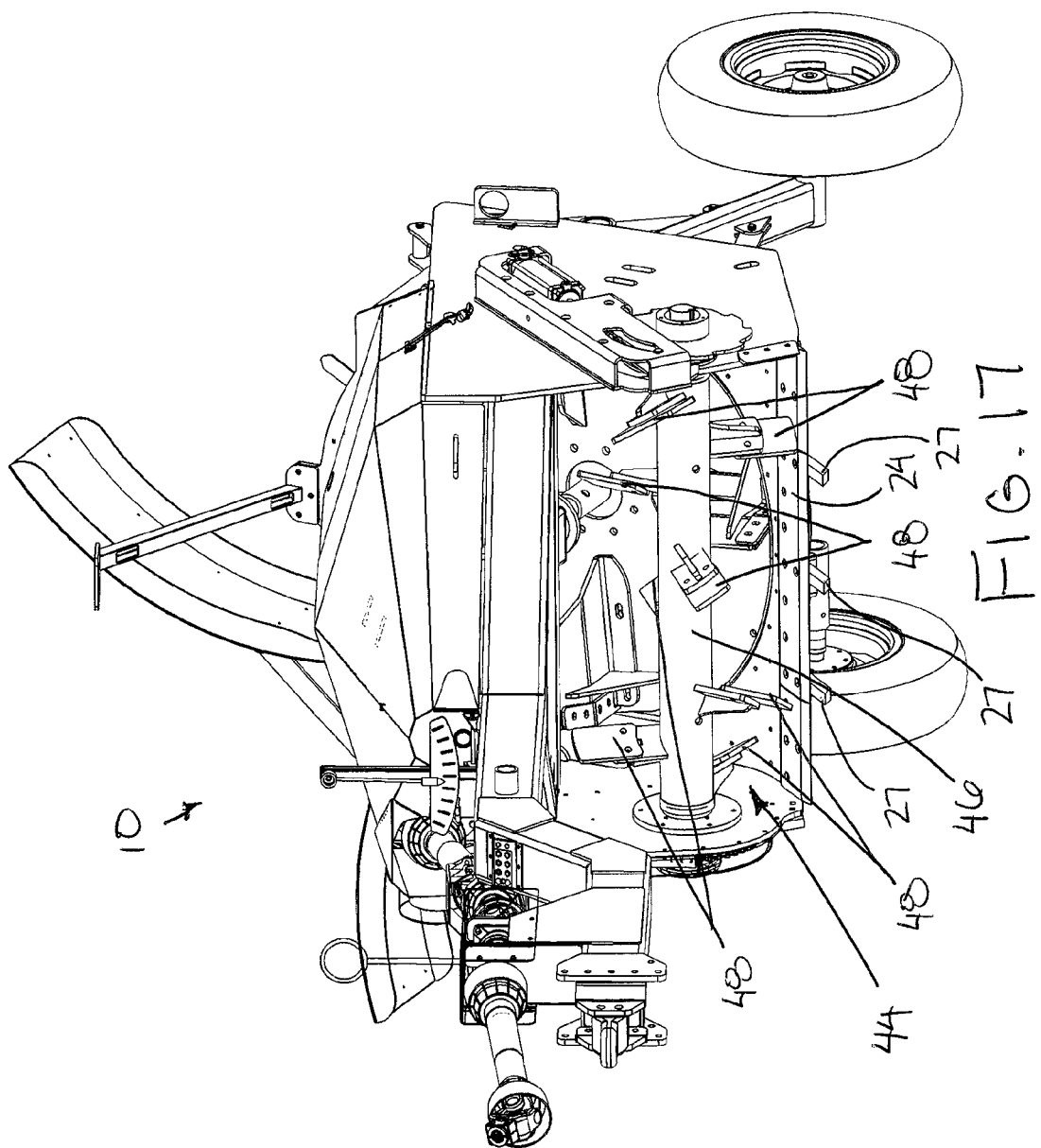
FIG. 17 is a perspective view of the soil spreading scraper device accordingly to FIG. 1, but with an alternative embodiment of the kicker supported thereon.
Figure 18:
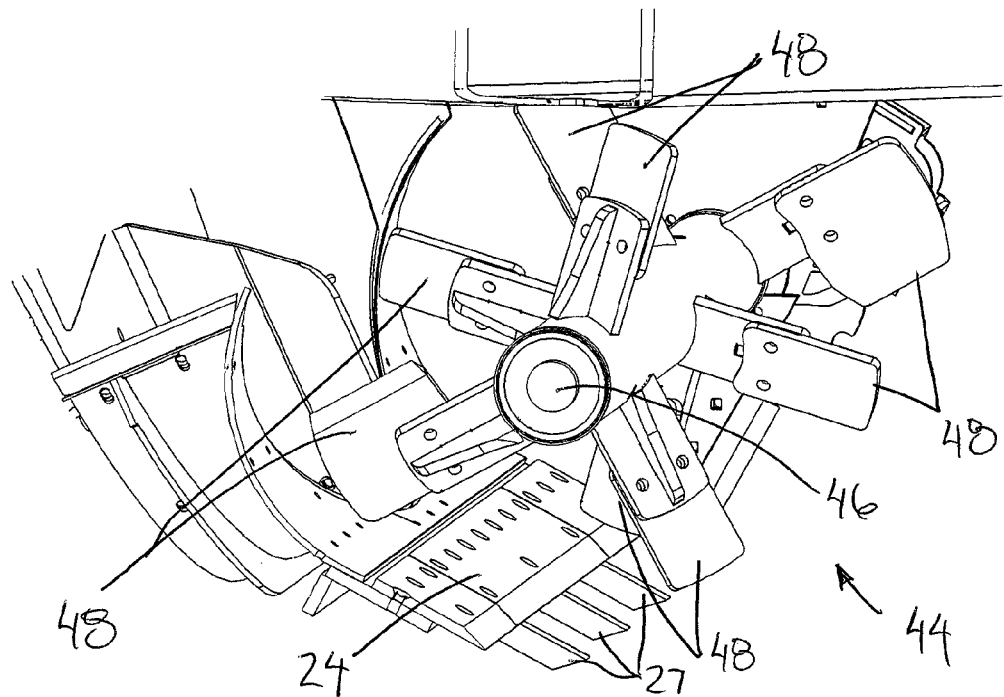
FIG. 18 is a perspective view of the alternative embodiment of the kicker according to FIG. 17.
Figure 19:
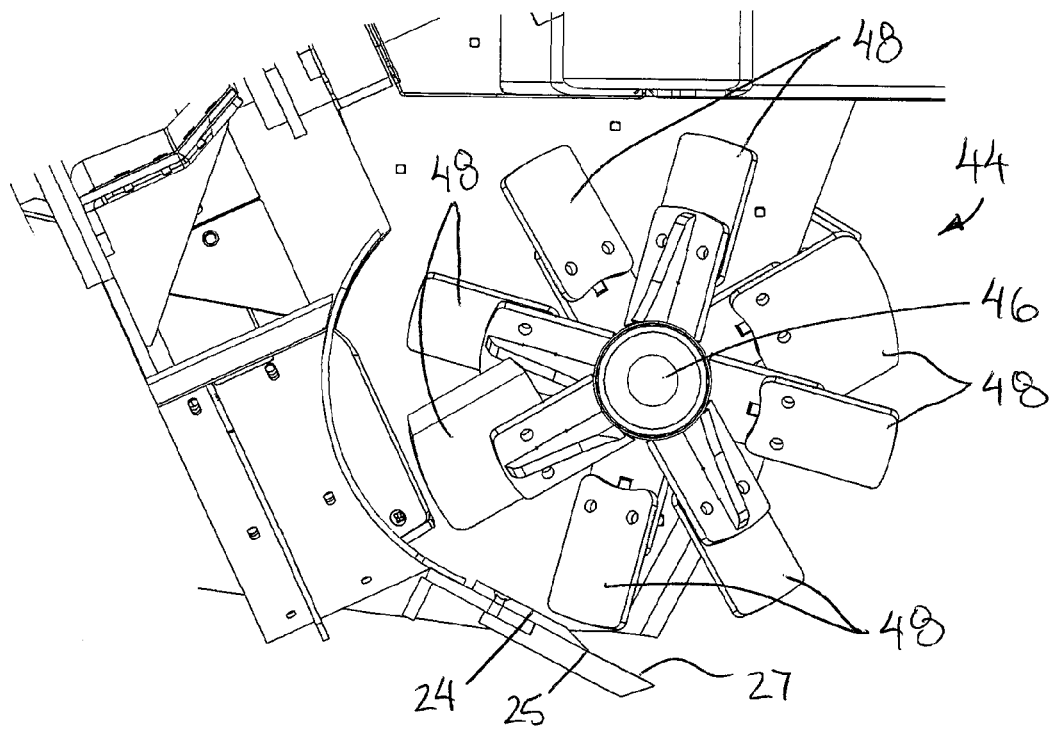
FIG. 19 is an end view of the alternative embodiment of the kicker according to FIG. 17.

A first embodiment of the kicker 44 is shown in FIGS. 1 to 5, and a second embodiment of the kicker 44 is shown in FIGS. 17 to 19.

In the first embodiment, the kicker blades 48 are arranged such that a total of 16 blades are provided in four rows. Each row includes four axially spaced apart kicker blades 48 which extend in a common radial direction of the shaft 46. The four rows are angularly offset in the circumferential direction at 90 degree intervals from one another. The soil striking sequence of the kicker thus involves four kicker blades 48 striking the cut soil at axially spaced apart positions at each 90 degree interval of rotation of the kicker shaft.

In the second embodiment of FIGS. 17 to 19, a total of eight kicker blades are provided at evenly spaced apart positions in the axial direction of the kicker shaft. Each kicker blade is angularly offset in the circumferential direction relative to all other ones of the kicker blades such that a single kicker blade is provided at each 45 degree interval about the circumference of the kicker shaft. The resulting soil striking sequence of the kicker blades prescribed by the mounting arrangement of the kicker blades on the shaft thus involves a single kicker blade striking the cut soil with each 45 degree interval of rotation of the kicker shaft. The striking of the kicker blades occurs at evenly spaced positions throughout the rotation. The prescribed ground striking sequence is further arranged such that no two kicker blades which are adjacent one another in the axial direction will strike the soil immediately one after the other, or adjacent to one another in the overall order of the prescribed soil striking sequence.

In alternate arrangements, the kicker may be provided with 10 kicker blades instead of 8, but the paddles remain evenly spaced apart relative to one another in the axial direction. The paddles are also arranged with a similar striking arrangement as described above with regard to the embodiment of FIGS. 17 to 19 such that a single blade strikes at evenly spaced apart positions in the rotation, and no two axially adjacent paddles strike in succession with one another. When using 10 kicker blades, one kicker blade is provided at each 36 degree interval about the circumference of the kicker shaft.

An impeller drive 54 is provided for receiving a driving rotation from a drive source comprising the power takeoff 14 of the towing vehicle. The impeller drive comprises an impeller gearbox 56 having an input shaft oriented generally horizontally and perpendicular to the forward working direction, and an output shaft which is geared to rotate with the input shaft rotation at a prescribed ratio and which is directly coupled to the impeller member at the axis thereof. The output shaft is parallel and coaxial with the impeller axis so that the output shaft of the impeller gearbox 56 and the impeller member can be directly coupled to one another in fixed relative orientation without any variable angle connectors therebetween.

The input shaft of the impeller gearbox 56 receives the driving rotation from the drive source through an auxiliary gearbox 62 having an input shaft oriented in the forward working direction and projecting forwardly towards the power takeoff of the towing vehicle. The auxiliary gearbox 62 is laterally offset in relation to the forward working direction from the impeller gearbox 56 so that a first output shaft 66 of the auxiliary gearbox is parallel and coaxial with the input shaft 58 of the impeller gearbox with which it is directly coupled so that the first output shaft 66 is also oriented generally horizontally and perpendicular to the forward working direction.

The auxiliary gearbox also includes an opposing second output shaft 68 extending horizontally outward in the opposing direction relative to the first output shaft 66 so that the two output shafts are generally concentric with one another. The second output shaft 68 is coupled via a drive chain 70 to one end of the shaft of the kicker 44 so as to define a kicker drive which drives the rotation of the kicker about its respective kicker axis from the driving rotation provided by the power takeoff 14 of the driving vehicle.

A drive shaft 74 is provided for coupling between the input shaft of the auxiliary gearbox 62 and the power takeoff of the tractor. The drive shaft 74 is provided with a multiple variable angle connectors in series to provide connection from the input shaft of the auxiliary gearbox to the power takeoff of the towing vehicle.

In the configuration described, the towing vehicle produces a driving rotation which is transferred from the power takeoff of the vehicle through the drive shaft 74, to the auxiliary gearbox 62 which in turn drives the impeller member through the impeller gearbox 56 and the kicker 44 through the drive chain 70.

In the event of debris being lodged between the kicker and the cutting blade or the pan 30, a reverser assembly 200 is used to force a reverse rotation of the kicker about the kicker axis to dislodge the debris.

The reverser assembly 200 includes a reverser frame comprised mainly of an inner upright wall 202 and an outer upright wall 204 which are parallel and spaced apart from one another at opposing interior and exterior sides of the frame and which are elongate in a longitudinal direction of the assembly between opposing first and second ends of the assembly.

The inner upright wall 202 is arranged to be fastened to a corresponding side wall of the main frame of the implement using threaded fasteners to permit the entire reverser assembly to be selectively removed as a unitary assembly if desired.

The outer upright wall 204 includes a top flange 206 along a top edge, an end flange 207 along one end and a plurality of bottom flanges 209 along the bottom edge. The flanges are formed integrally with the outer wall 204 and project perpendicularly inward towards the inner wall 202. Slots in the inner wall 202 receive the inner ends of the flanges therein for alignment prior to welding to integrally join the inner and outer walls with one another.

A ratchet wheel 208 is mounted on an external end of the shaft of the kicker 44 which projects through the side wall of the main frame so as to be rotatable with the kicker about the kicker axis. The ratchet wheel 208 comprises a hub portion 210 fixed onto the end of the shaft and a surrounding disc portion. The hub portion couples the ratchet wheel to the kicker such that the kicker is rotatable with the ratchet wheel about the kicker axis in a direction opposite to a normal working direction. The hub may comprise a one-way clutch such that the ratchet wheel does not normally rotate when the kicker is rotated in the normal working direction corresponding to throwing of soil rearwardly at the bottom side thereof from the cutting blade area to the impeller member.

The disc portion is in the form of a generally circular plate extending radially outward from the kicker axis to a peripheral edge which is formed to define a plurality of circumferentially spaced apart ratchet teeth 212. Each ratchet tooth includes an end face 214 which is generally radially oriented so as to be substantially perpendicular to the circumferential direction, and an opposing sloped face 216 which defines a camming surface as described in further detail below.

The reverser assembly further includes a ratchet pin 218 arranged for ratcheting engagement with the ratchet teeth on the ratchet wheel. The ratchet pin 218 is supported in fixed relation onto one end of a linear hydraulic actuator 220. The actuator 220 is hydraulic piston cylinder which is pivotally coupled at the cylinder end on the reverser frame at one end of the frame for pivotal movement about an axis oriented parallel to the kicker axis. The actuator 220 extends generally in the longitudinal direction of the reverser frame, between the inner and outer upright walls of the frame so as to fixedly support the ratchet pin on the piston end of the actuator.

The reverser frame supports the ratchet pin for stroking movement in a tangential direction relative to the kicker axis along an upper side of the kicker by being suitably mounted on the main frame to receive the upper portion of the ratchet wheel between the inner and outer upright walls of the reverser frame. As the actuator is extended and retracted, under suitable control of hydraulic valves of a hydraulic system of the device 10, the ratchet pin is effectively stroked in a first direction towards a first extended position and in an opposing second direction towards an opposing second retracted position.

An arcuate guide slot 222 is provided in both of the inner wall 202 and the outer wall 204 to receive opposing ends of the ratchet pin therein as the pin is stroked between the first and second positions thereof. The guide slots collectively define a guide on the reverser frame which restricts movement of the ratchet pin substantially along an upper side of the ratchet wheel between the first and second positions. The guide slots are generally arcuate about the kicker axis and are also elongated in the longitudinal direction of linear movement of the actuator. The width of the slots transverse to the longitudinal direction and radial to the kicker axis are arranged to be greater than the diameter of the ratchet pin to allow for some outward radial displacement of the ratchet pin over the ratchet teeth when displaced in the first direction.

The ratchet pin and the ratchet teeth on the ratchet wheel are oriented and configured such that the ratchet pin is slidably displaced over the sloped faces 216 ratchet teeth without rotating the ratchet wheel when displaced in the first direction and such that the ratchet pin positively engages the end face 214 of one of the ratchet teeth to drive rotation of the ratchet wheel opposite to the normal working direction of the kicker when displaced in the second direction.

Typically, the linear hydraulic actuator, the ratchet pin, and the guide are selectively removable from the main frame together with the reverser frame as a unitary assembly. The outer wall 204 is open about the cylinder portion of the actuator to provide ready access for connection and disconnection of hydraulic lines to the actuator.

The reverser assembly is only used when the kicker is prevented from rotating due to debris lodged therein. When not in use, the reverser assembly remains in an out of use position. This is accomplished by providing the slots 222 with a terminal portion 224 farthest from the opposing end of the actuator which is spaced outward from the kicker axis greater than a maximum radius of the ratchet teeth. Accordingly, when the actuator is extended to a maximum stroke length, the ratchet pin is located in the terminal portion so that the ratchet pin does not interfere with or engage the ratchet wheel as the ratchet wheel rotates with normal use of the kicker. When the kicker is lodged with debris, the actuator is retracted in the second direction towards the second position such that the ratchet pin engages one of the ratchet teeth and forces rotation of the ratchet wheel and kicker therewith in the second direction opposite to the normal working direction of the kicker. The actuator may be reciprocated more than once between the first and second positions until the kicker is sufficiently reversed to dislodge the debris. Each time the ratchet pin is displaced in the first direction, the pin rides over the ratchet teeth so that the kicker does not rotate, but the return stroke in the second direction results in another ratchet tooth being positively engaged to continue rotating the kicker in the reverse direction.

In regular use, the device 10 is connected to the hitch of a towing vehicle and is towed in the forward working direction across the ground. Height of the frame relative to the ground is adjusted to cut an appropriate thickness of a top layer of soil from the ground using the cutting blade 24. The cutting blade lifts the top layer of soil onto the pan where the kicker blades of the kicker rotate to propel the cut soil rearwardly onto the open top side of the impeller member whose rotation spreads the cut soil deposited thereon generally radially outward from the impeller axis onto the chutes 40 which project the soil laterally outward in a sideways direction generally perpendicular to the forward working direction, but at a slight rearward incline.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees from horizontal;

a cutting blade supported on the frame forwardly and downwardly relative the impeller member and arranged to cut a top layer of soil from the ground as the frame is displaced in the forward working direction; and a kicker supported on the frame for rotation about a kicker axis spanning above the cutting blade transversely to the forward working direction and arranged to propel soil generally rearward onto the impeller member;

the impeller member comprising a plurality of impeller blades arranged to spread soil deposited on the impeller member generally radially outward from the impeller axis as the impeller member is rotated;

the cutting blade projecting downwardly and forwardly to a forward cutting edge at a front end of the cutting blade at an angle from horizontal which is less than an angle from horizontal of the plane of rotation of the impeller member; and the forward cutting edge at the front end of the cutting blade being positioned rearwardly of the kicker axis.

2. The device according to claim 1 wherein the angle from horizontal of the cutting blade is less than 45 degrees from horizontal.

3. The device according to claim 1 wherein the angle from horizontal of the cutting blade is between 15 and 25 degrees from horizontal.

4. The device according to claim 1 further comprising a plurality of soil engaging fingers projecting downwardly and forwardly from the forward cutting edge of the cutting blade at laterally spaced apart positions.

5. The device according to claim 4 wherein the soil engaging fingers terminate at respective forward ends which are in proximity to a vertical plane locating the kicker axis therein.

6. The device according to claim 1 wherein the kicker comprises:

a shaft supported along the kicker axis for rotation about the kicker axis relative to the frame; and a plurality of kicker blades mounted on the shaft to extend generally radially outwardly therefrom;

each kicker blade being angularly offset in a circumferential direction relative to all other ones of the kicker blades.

7. The device according to claim 6 wherein the kicker blades are all spaced apart from one another in an axial direction of the kicker axis, and wherein the kicker blades are mounted angularly offset from one another in the circumferential direction according to a prescribed soil striking sequence in which no axially adjacent pairs of the kicker blades are immediately adjacent one another in the prescribed soil striking sequence.

8. The device according to claim 1 wherein the impeller member comprises a disc body and the plurality of impeller blades are supported on the disc body so as to be arranged to spread soil deposited on the impeller member generally radially outward from the impeller axis as the impeller member is rotated, each of the impeller blades comprising:

a main body portion which projects generally upward from the disc body in a direction of the impeller axis and which extends radially outward from an inner end in proximity to the impeller axis to an outer end in proximity to a peripheral edge of the impeller member; and a wear member supported on the main body portion to project radially outward beyond the outer end of the main body portion;

the wear member being adjustable in a radial direction relative to the main body portion.

9. The device according to claim 1 further comprising a reverser assembly which comprises:

a reverser frame mounted on the main frame;

a ratchet wheel mounted about the kicker axis, the ratchet wheel including a plurality of circumferentially spaced apart ratchet teeth thereon;

a ratchet pin arranged for ratcheting engagement with the ratchet teeth on the ratchet wheel;

a linear hydraulic actuator supported on the reverser frame and supporting the ratchet pin thereon so as to be arranged to stroke the ratchet pin in a first direction towards a first position and in an opposing second direction towards ano opposing second position;

a guide on the reverser frame arranged to restrict movement of the ratchet pin substantially along one side of the ratchet wheel between the first and second positions;

the ratchet pin and the ratchet teeth on the ratchet wheel being configured such that the ratchet pin is slidably displaced over the ratchet teeth without rotating the ratchet wheel when displaced in the first direction and such that the ratchet pin positively engages one of the ratchet teeth to drive rotation of the ratchet wheel when displaced in the second direction;

the ratchet wheel being coupled to the kicker such that the kicker is rotatable with the ratchet wheel about the kicker axis in a direction opposite to a normal working direction when the ratchet wheel is rotated with displacement of the ratchet pin in the second direction;

wherein the linear hydraulic actuator, the ratchet pin, and the guide are selectively removable from the main frame together with the reverser frame as a unitary assembly.

10. A soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees from horizontal;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a disc body and a plurality of impeller blades supported on the disc body so as to be arranged to spread soil deposited on the impeller member generally radially outward from the impeller axis as the impeller member is rotated;

each of the impeller blades comprising:

a main body portion which projects generally upward from the disc body in a direction of the impeller axis and which extends radially outward from an inner end in proximity to the impeller axis to an outer end in proximity to a peripheral edge of the impeller member; and a wear member supported on the main body portion to project radially outward beyond the outer end of the main body portion;

the wear member being adjustable in a radial direction relative to the main body portion of the impeller blade.

11. The device according to claim 10 wherein the wear member of each impeller blade is supported on the main body portion using threaded fasteners, and wherein at least one of the main body portion and the wear member comprises fastener apertures receiving the threaded fasteners therethrough in which the fastener apertures are elongated in the radial direction.

12. The device according to claim 10 wherein the main body portion of each impeller blade is supported on the disc body so as to be adjustable relative to the disc body in the radial direction.

13. The device according to claim 10 wherein the wear member of each impeller blade has a mounting portion which is fastened to a trailing side of the main body portion and an end portion which projects from the mounting portion into a direction of rotation of the impeller member so as to overlap the outer end of the main body portion.

14. The device according to claim 10 wherein each impeller blade further comprises an upper portion extending radially along a top edge of the main body portion and being inclined upwardly and forwardly into a direction of rotation of the impeller member, and wherein the wear member spans both an outer end of the upper portion and the outer end of the main body portion.

15. A soil spreading scraper device comprising:
a main frame supported for movement along the ground in a forward working direction;
an impeller member supported on the main frame for rotation about an impeller axis within a plane of rotation lying generally perpendicularly to the impeller axis, the plane of rotation extending generally upward and rearward at an angle between 45 degrees and 75 degrees from horizontal;
a cutting blade supported on the main frame forwardly and downwardly relative the impeller member and arranged to cut a top layer of soil from the ground as the main frame is displaced in the forward working direction;
a kicker supported on the main frame for rotation about a kicker axis spanning above the cutting blade transversely to the forward working direction in a working direction so as to be arranged to propel soil cut by the cutting blade generally rearward onto the impeller member;
the impeller member comprising a plurality of impeller blades arranged to spread soil deposited on the impeller member generally radially outward from the impeller axis as the impeller member is rotated;
a reverser assembly comprising:
a unitary reverser frame mounted on the main frame so as to be readily releasable from the main frame;
a ratchet wheel mounted about the kicker axis, the ratchet wheel including a plurality of circumferentially spaced apart ratchet teeth thereon;
a ratchet pin supported on the unitary reverser frame so as to be arranged for ratcheting engagement with the ratchet teeth on the ratchet wheel;
a linear hydraulic actuator supported on the unitary reverser frame and supporting the ratchet pin thereon so as to be arranged to stroke the ratchet pin in a first direction towards a first position and in an opposing second direction towards an opposing second position;
a guide supported on the unitary reverser frame so as to be arranged to restrict movement of the ratchet pin substantially along one side of the ratchet wheel between the first and second positions;
the ratchet pin and the ratchet teeth on the ratchet wheel being configured such that the ratchet pin is slidably displaced over the ratchet teeth without rotating the ratchet wheel when displaced in the first direction and such that the ratchet pin positively engages one of the ratchet teeth to drive rotation of the ratchet wheel when displaced in the second direction;
the ratchet wheel being coupled to the kicker such that the kicker is rotatable with the ratchet wheel about the kicker axis in a direction opposite to the working direction when the ratchet wheel is rotated with displacement of the ratchet pin in the second direction;
wherein the linear hydraulic actuator, the ratchet pin, and the guide are adapted to remain supported on the unitary reverser frame as a unitary assembly when the reverser frame is removed from the main frame.

16. The device according to claim 15 wherein the linear hydraulic actuator is pivotally coupled to the reverser frame at a first end of the actuator and wherein the ratchet pin is supported in fixed relation to a second end of the actuator.

17. The device according to claim 15 wherein the reverser frame is coupled to the main frame using threaded fasteners.

18. The device according to claim 15 wherein the frame includes at least one upright wall locating a slot therein which receives one end of the ratchet pin therein so as to define the guide which guides movement of the ratchet pin between the first and second positions.

19. The device according to claim 18 wherein said at least one upright wall includes an inner upright wall and an outer upright wall receiving the ratchet wheel and the linear hydraulic actuator therebetween, wherein both upright walls locate respective slots therein which receive opposing ends of the ratchet pin therein such that the two slots collectively define the guide.

20. The device according to claim 18 wherein the slot has a width which is greater than a diameter of the pin so as to allow outward displacement of the ratchet pin in a radial direction of the ratchet wheel over the ratchet teeth when displaced in the first direction.

* * * * *